US012625771B2

(12) United States Patent
Karuppur Rajagopalan et al.

(10) Patent No.: US 12,625,771 B2
(45) Date of Patent: May 12, 2026

(54) PARALLELIZING RESTORATION OF DATABASE FILES

(71) Applicant: Rubrik, Inc., Palo Alto, CA (US)

(72) Inventors: Ganesh Karuppur Rajagopalan, Los Gatos, CA (US); Prasenjit Sarkar, Los Gatos, CA (US); Prabhu Mohan, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 100 days.

(21) Appl. No.: 18/479,641

(22) Filed: Oct. 2, 2023

(65) Prior Publication Data

US 2025/0110834 A1 Apr. 3, 2025

(51) Int. Cl.
*G06F 11/14* (2006.01)
*G06F 11/1446* (2026.01)

(52) U.S. Cl.
CPC ...... *G06F 11/1451* (2013.01); *G06F 11/1464* (2013.01); *G06F 11/1469* (2013.01)

(58) Field of Classification Search
CPC ............. G06F 11/1451; G06F 11/1464; G06F 11/1469
USPC ........................................................ 714/6.3
See application file for complete search history.

(56) References Cited

U.S. PATENT DOCUMENTS

| | | | |
|---|---|---|---|
| 6,453,325 B1 * | 9/2002 | Cabrera .............. | G06F 11/1461 |
| 8,676,851 B1 * | 3/2014 | Nesbit ................. | G06F 16/1774 |
| | | | 707/791 |
| 9,058,122 B1 * | 6/2015 | Nesbit ................. | G06F 16/1844 |
| 2004/0221294 A1 * | 11/2004 | Kalmuk .................. | G06F 9/544 |
| | | | 719/312 |
| 2011/0264989 A1 * | 10/2011 | Resch ................. | H04L 67/1097 |
| | | | 714/E11.034 |
| 2020/0210091 A1 * | 7/2020 | Shu ...................... | G06F 11/1458 |
| 2021/0303418 A1 * | 9/2021 | Swami ................... | G06F 16/13 |
| 2022/0091942 A1 * | 3/2022 | Mukku ............... | G06F 11/1464 |

OTHER PUBLICATIONS

"Input-output system calls in C | Create, Open, Close, Read, Write", Oct. 28, 2021, GeekForGeeks, https://www.geeksforgeeks.org/input-output-system-calls-c-create-open-close-read-write/ (Year: 2021).*

* cited by examiner

*Primary Examiner* — Ashish Thomas
*Assistant Examiner* — Catherine Marie Nguyen
(74) *Attorney, Agent, or Firm* — Holland & Hart LLP

(57) ABSTRACT

Methods, systems, and devices for data management are described. Point-in-time data that includes one or more files may be generated from data management information stored at a data management system having multiple nodes. One or more sets of virtual partitions may be created for at least one file of the one or more files. One or more external file descriptors associated with respective locations of the at least one file and one or more sets of internal file descriptors associated with respective external file descriptors and locations of corresponding sets of virtual partitions may be generated in response to a request. One or more subsequent requests to read the at least one file may be routed to the nodes based on the one or more sets of internal file descriptors. Based on the routing, the respective portions of the one or more files may be output in parallel.

19 Claims, 7 Drawing Sheets

| Node 385-1 | DMS Manager 390 | DMS Agent 315 | Data Object 320 |
|---|---|---|---|

302: Initiate Data Management Procedure

306: Materialize Point-in-Time Data

309: Create Virtual Partitions

312: Distribute Virtual Partitions

316: Request to Open File

319: Generate External and Internal File Descriptors

322: Return Ext. File Descriptor

326: Request to Read File

329: Route Read Requests

332: Output File Sections

336: Aggregate File Sections Into File

339: Send File

342: Request to Close File

346: Close File Sections

349: Indicate File Sections Closed

352: Indicate File Closed

300

FIG. 3

Materialization Component

525

File Descriptor Component

535

Output Component

545

Aggregation Component

555

Duplication Component

565

Partition Component

530

Routing Component

540

Restoration Component

550

Backup Component

560

520

500

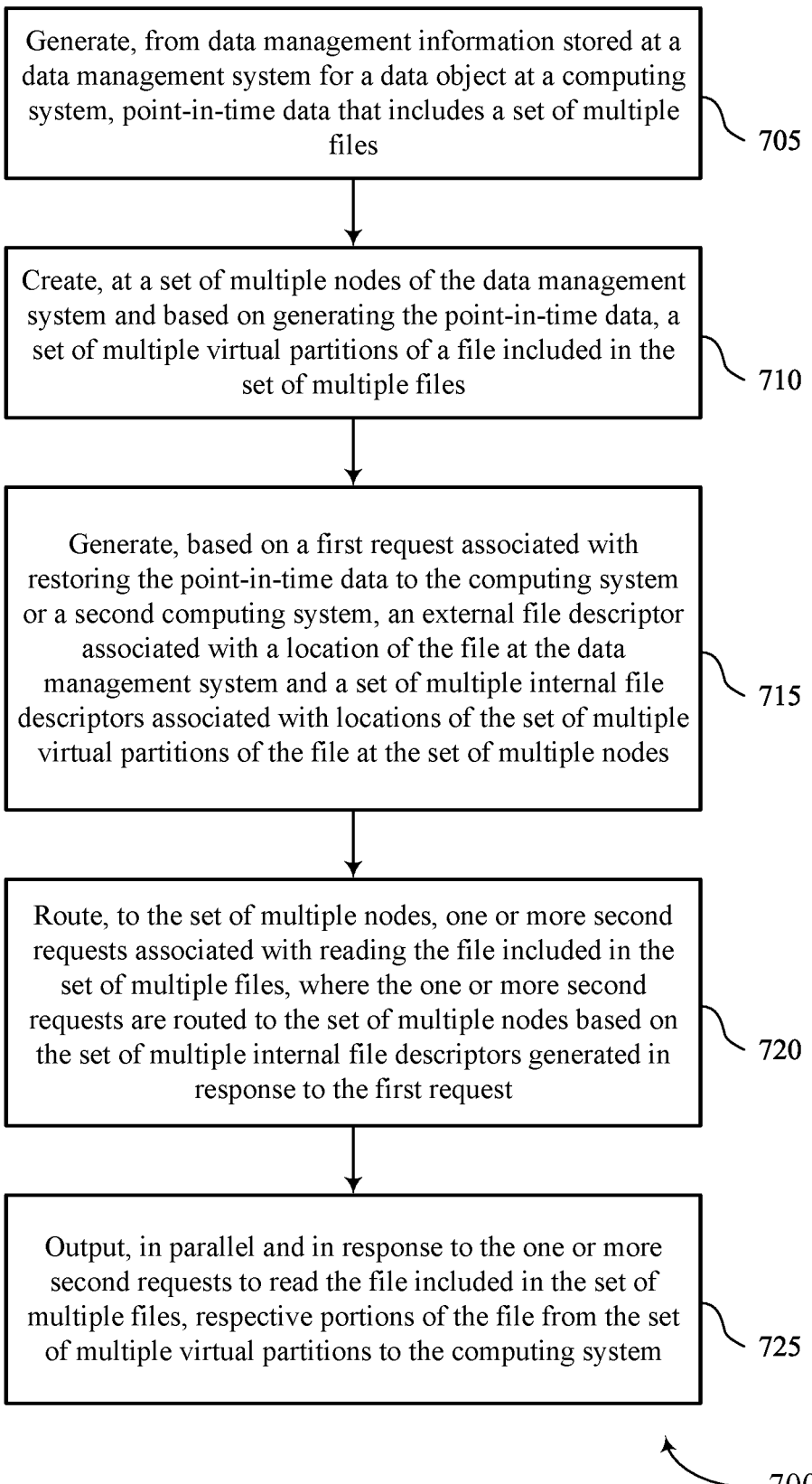

Generate, from data management information stored at a data management system for a data object at a computing system, point-in-time data that includes a set of multiple files ⟍ 705

Create, at a set of multiple nodes of the data management system and based on generating the point-in-time data, a set of multiple virtual partitions of a file included in the set of multiple files ⟍ 710

Generate, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes ⟍ 715

Route, to the set of multiple nodes, one or more second requests associated with reading the file included in the set of multiple files, where the one or more second requests are routed to the set of multiple nodes based on the set of multiple internal file descriptors generated in response to the first request ⟍ 720

Output, in parallel and in response to the one or more second requests to read the file included in the set of multiple files, respective portions of the file from the set of multiple virtual partitions to the computing system ⟍ 725

PARALLELIZING RESTORATION OF DATABASE FILES

FIELD OF TECHNOLOGY

The present disclosure relates generally to data management, including techniques for parallelizing restoration of database files.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 3 shows an example of a set of operations for parallelizing restoration of database files in accordance with aspects of the present disclosure.

FIG. 7 shows a flowchart illustrating methods that support parallelizing restoration of database files in accordance with aspects of the present disclosure.

DETAILED DESCRIPTION

A data management system (DMS) may provide data management services (e.g., backup, restore, duplication, failover, data analysis, threat detection) for data objects (e.g., data, file systems, applications, databases) implemented at a computing system. The DMS may coordinate with an agent installed at (e.g., on) the computing system to perform or otherwise support one or more of the data management services for the data objects. In some examples, the agent may further coordinate with the data objects to affect a data management operation. In some cases, to perform a data management service, the agent may execute data management operations that are native to the data object. For example, the agent may execute a native backup operation, a native restore operation, a native duplication operation, or the like, to support a corresponding data management service provided by the DMS.

Some data objects implemented at a computing system may support the generation of files that are larger than a threshold size (e.g., larger than 500 Gigabytes). Such files may be referred to as "very large files." For data objects that support very large files and for which native operations are used to support data management services of the DMS, the execution of the data management services may experience significant latency if the native operations fail to support parallelized processing of sections of individual files. In some examples, a data object may support parallelized processing of sections of individual files for some data management operations (e.g., backup operations) but not others (e.g., restore operations, duplication operations). Accordingly, for a data object, execution of some data management services may experience significant latency.

Thus, mechanisms (e.g., techniques, components, configurations) that enable all data management functions (e.g., backup, restoration duplication) to support parallelized processing of sections of individual files (e.g., on a per-section basis) for data objects (e.g., that support very large files, that do not have native functions that support per-section processing for all data management functions) may be desired.

To support parallelized processing of sections of individual files for all data management functions, virtual partitions of one or more files (e.g., files that exceed a size threshold) materialized for a data management process (e.g., a restoration procedure, a duplication procedure, etc.) may be distributed across the nodes of a data management system and processed in parallel by the nodes.

Figure 1:
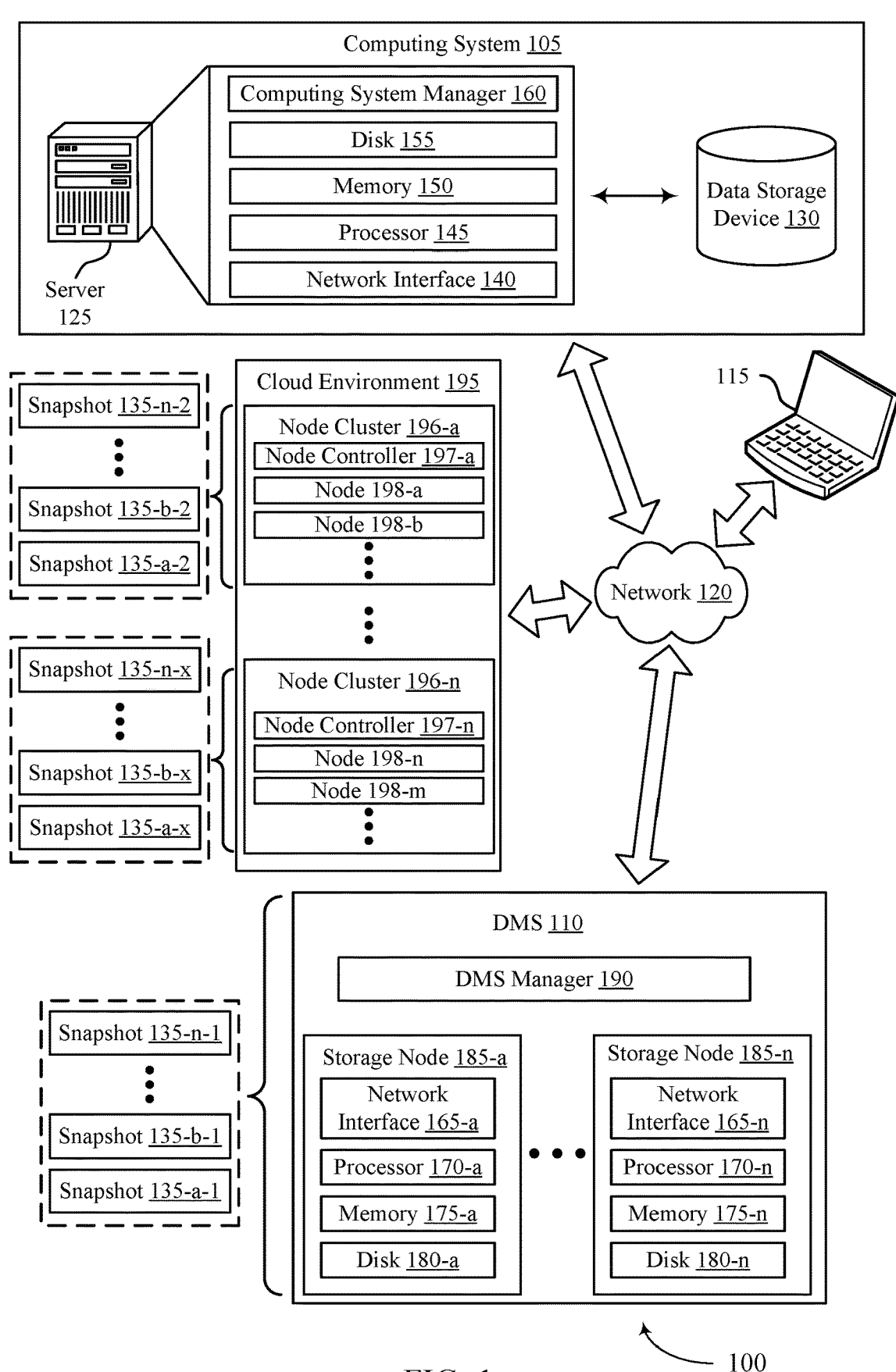
FIG. 1 illustrates an example of a computing environment that supports parallelizing restoration of database files in accordance with aspects of the present disclosure.

FIG. 1 illustrates an example of a computing environment 100 that supports parallelizing restoration of database files in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random-access memory (SRAM), dynamic random-access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

A computing system (such as the computing system 105) may support data objects (e.g., applications, virtual machines, file systems, databases) that support the generation of files that are individually capable of storing very large amounts of data (e.g., up to 128 terabytes of data). For example, the computing system may support the operation of an Oracle database, which may support the generation of Bigfile Tablespaces. In some examples, such data objects may include native functionality for backing up the data of the data object to an image backup file (which may be a byte-for-byte backup of the data object). Additionally, or alternatively, such data objects may include native functionality for restoring the data in an image backup file to the data object, another instance of the data object (e.g., that shares a same name or unique identifier), or another (e.g., duplicate or failover) deployment of the data object. Additionally, or alternatively, such data objects may include native functionality for duplicating the data of a data object to another instance or deployment of the data object.

In some examples, the native image backup functionality for a data object may be used to backup individual files (e.g., user files, control files, system files) of the data object sequentially—e.g., one file at a time, on a per-file basis. The native image backup functionality may be further capable of backing up multiple files in parallel (using multiple computing threads), though each thread may be configured to backing up complete files. In such cases, very large files (which may refer to files larger than a threshold size, e.g., larger than 500 Gigabytes) may present a bottleneck to a backup task using the native backup functionality—e.g., one very large file may prevent a backup task from completing until a designated computing thread completes the backup of the very large file.

For example, if a data object stores all of its data in a single very large file, then the backup task may be executed using a single computing thread and the duration of the backup task may, thus, be based on the processing capability of the single computing thread. Additionally, other computing threads may be available for the backup task and may go unused. Similarly, if a data object stores a majority of its data in a single very large file, then a single computing thread may be used to backup the large file and the duration of the backup task may, effectively, be based on the processing capability of the single computing thread. In such cases, other computing threads may be available to backup the other smaller files but once the other smaller files are backed up, these computing threads may go unused for the remainder of the backup task. In yet other examples, a data object may store its data in a balanced mix of differently sized files. In such cases, a very large file may present a bottleneck based on its size and/or when backup is initiated for the very large file. That is, if the very large file is greater than a threshold (e.g., greater than a terabyte), a duration for backing up the very large file using a computing thread may exceed a duration for backing up all of the other files. Also, if an operation for backing up a very large file begins near the end of the backup task, then the duration of the backup task may extend until the backup of the very large file completes, even though the backup of the remaining files may be completed.

To reduce a bottleneck caused by very large files in an image backup task, the data object may be further capable of backing up sections (which may also be referred to as portions) of individual files in parallel (e.g., on a per-section basis). In such cases, individual files (e.g., that are larger than a threshold size) may be broken into sections (e.g., sections of a particular size), and multiple computing threads may be used to backup the sections of individual files in parallel. In some examples, the data object may support a dedicated command (e.g., a partitioned image backup command) that enables parallelized backup of individual files of the data object in sections.

In some examples, the native restoration functionality for the data object may be used to restore individual files of the data object from a previous image backup—e.g., to a current instance of the data object that was to generate the image backup, another (e.g., new) instance of the data object, a separate deployment of the data object. In some examples, (with contrast to a backup process) a restoration process may include operations for ensuring that the files of the data object are restored in such a way that enables the restored data object to run (e.g., to support user functions) at a conclusion of the restoration. For example, the restoration process may first restore control files for the data object that can be used to support the operation of the data object before restoring data files to the data object. In some examples, the native restoration functionality may support the restoration of individual files in parallel (e.g., on a per-file basis), but may not support the restoration of sections of the individual files in parallel (e.g., on a per-section basis). Thus, very large files may present a bottleneck to restoring data from an image backup.

In some examples, the native duplication functionality for the data object may be used to duplicate individual files of one deployment of the data object (e.g., on a first computing system) to a separate deployment of the data object (e.g., on a second computing system). In some examples, (with contrast to a backup process) a duplication process may include operations for ensuring that the files of the data object are restored in such a way that enables the duplicated data object to run (e.g., to support user functions) at a conclusion of the duplication. For example, the restoration process may first duplicate control files for the data object that can be used to support the operation of the data object before duplicating data files to the data object. In some examples, the native duplication functionality may support the duplication of individual files in parallel but may not support the duplication of sections of the individual files in parallel. Thus, very large files may present a bottleneck to duplicating data from one data object to another.

As noted herein, the DMS 110 may be configured to manage data stored at one or more computing systems (such as the computing system 105). For example, the DMS 110 may be configured to provide one or more data management services (e.g., a backup service, a restoration service, a duplication service, a data analysis service) for a computing system, for one or more data objects running at the computing system, or the like. In some examples, an agent of the DMS 110 is installed at the computing system and facilitates (e.g., in coordination with the DMS 110) the execution of the data management services for the computing system.

In some examples, the agent of the DMS 110 is configured to extend the data management services of the DMS 110 to a data object of the computing system, where the data object may support the generation of very large files. In such cases, the agent of the DMS 110 may be configured to assist the backup (e.g., as snapshot or data backup files) of the data object to the DMS 110. In some examples, to assist the backup of the data object, the agent of the DMS 110 may be configured to execute an image backup operation that is native to the data object to cause the data object to transfer its data to an image backup at a desired location (e.g., at the DMS 110). In some examples, the agent of the DMS 110 (and/or the DMS 110) may be configured to store the transferred data in a data backup or snapshot format. In some cases, a first backup of the data object may be a full (byte-for-byte) backup of the data (e.g., user and control data) of the data object and may be stored as a base backup. Subsequent backups of the data object may be incremental backups of the data of the data object and may be stored as incremental backups (e.g., on top of the base backup and/or other intervening backups). In some examples, the agent of the DMS 110 is used to monitor changes (e.g., additions, deflection, modifications) in the data of the data object from one backup to another and to transfer and/or indicate the data changes to the DMS 110 to be stored in incremental backups. To reduce a latency of an image (byte-for-byte) backup operation, the agent may be configured to execute a partitioned image backup operation that is native to the data object and enables sections of individual files to be transferred to the image backup in parallel (e.g., on a per-section basis).

The agent of the DMS 110 may be further configured to assist the DMS 110 in the restoration of the data object to a desired point-in-time from a previously captured backup. In some examples, to assist in the restoration of the data object, the agent of the DMS 110 may be configured to execute a restoration operation that is native to the data object to cause the desired point-in-time data to be restored to the data object from the image backup. In some examples, prior to transferring the data from the image backup, the DMS 110 may recreate the files of the desired point-in-time data from one or more backups (which may be referred to as materializing the snapshot that corresponds to the point-in-time). After the files of the data object are recreated for the point-in-time, the agent of the DMS 110 (e.g., in coordination with the DMS 110) may restore the files to the data object. However, as described herein, native restoration operation of the data object may prevent the agent from restoring sections of individual files to the data object in parallel (e.g., on a per-section basis), which may significantly increase a latency of the restoration process.

Additionally, or alternatively, the agent of the DMS 110 may be further configured to assist the DMS 110 in the duplication of the data object to another location. In some examples, to assist in the duplication of the data object, the agent of the DMS 110 may be configured to execute a duplication operation that is native to the data object to cause data at the data object to be duplicated to another deployment of the data object. However, as described herein, native duplication operation of the data object may prevent the agent from duplicating sections of individual files to the data object in parallel (e.g., on a per-section basis), which may significantly increase the latency of the duplication process.

Thus, mechanisms (e.g., techniques, components, configurations, etc.) that enable all data management functions (e.g., backup, restoration, duplication, etc.) to support parallelized processing of sections of individual files (e.g., on a per-section basis) for data objects (e.g., that support very large files, that do not have native functions that support per-section processing for all data management functions, etc.) may be desired.

To support parallelized processing of sections of individual files for all data management functions, virtual partitions (which may also be referred to as "splits") of one or more files (e.g., files that exceed a size threshold) materialized for a data management process (e.g., a restoration procedure, a duplication procedure, etc.) may be distributed across the nodes of a data management system and processed in parallel by the nodes.

In some examples, the DMS 110 may generate, from data management information (e.g., backup files, snapshot files, etc.) stored for a data object at the computing system 105, point-in-time data that includes one or more files—e.g., in response to a restoration request, a duplication request, etc. In some examples, generating the point-in-time data may also be referred to as materializing the point-in-time data. Based on generating the point-in-time data, the DMS 110 may identify at least a subset of the one or more files (e.g., a file) that exceeds a size threshold and may create multiple virtual partitions of the file. The DMS 110 may distribute the multiple virtual partitions across a set of nodes (e.g., the storage nodes 185) of the DMS 110.

Subsequently, the DMS 110 may receive a request associated with processing the point-in-time data—e.g., a request associated with restoring or duplicating the point-in-time data to the computing system 105 (or to a second computing system). In some examples, the request is a request to open the file for a data management operation (e.g., a restoration operation or a duplication operation). In response to the request, the DMS 110 may generate an external file descriptor for the file that provides a mechanism for an external device (e.g., the computing system 105) to reference the file stored at the DMS 110 during the data management operation. The DMS 110 may provide the external file descriptor to the computing system 105. Also, the DMS 110 may generate multiple internal file descriptors for the multiple virtual partitions of the file that provide a mechanism for the DMS 110 to identify the locations of the virtual partitions within the DMS 110—e.g., when the computing system 105 references the external file descriptor in a request. The DMS 110 may also generate a mapping between the external file descriptor and the internal file descriptors.

Subsequently, the DMS 110 may receive a request (e.g., including the external file descriptor) associated with reading the file (e.g., to restore or duplicate the file to the computing system 105 or the second computing system) and may route one or more instances of the request to the nodes of the DMS 110 in accordance with the internal file descriptors (e.g., based on the mapping between the external file descriptor and the internal file descriptors). The nodes of the DMS 110 may then output, to the computing system 105 (or the second computing system), and in response to the one or more instances of the request, respective portions of the file from the virtual partitions.

By creating virtual partitions of one or more files in materialized data (e.g., files that exceed a size threshold) and distributing those files across multiple nodes, the one or more files may be transferred to the computing system in parallel, decreasing a latency associated with transferring the file and mitigating bottlenecks that may be caused by the file in a larger data transfer process.

Figure 2:
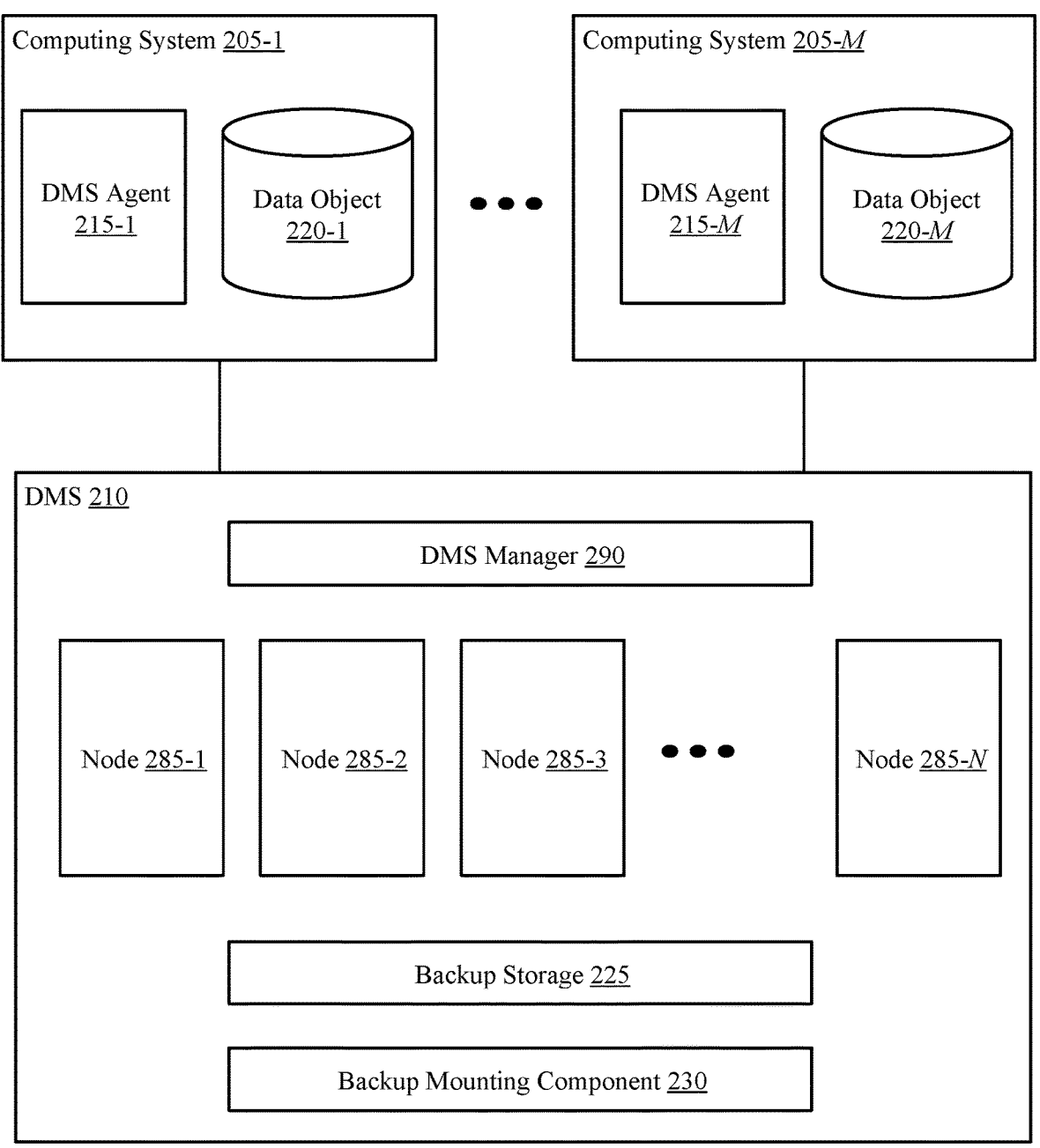
FIG. 2 shows an example of a subsystem that supports parallelizing restoration of database files in accordance with aspects of the present disclosure.

FIG. 2 shows an example of a subsystem that supports parallelizing restoration of database files in accordance with aspects of the present disclosure.

The subsystem 200 may include the one or more computing systems 205 and the DMS 210, which may be respective examples of computing systems (e.g., the computing system 105 of FIG. 1) and a DMS (e.g., the DMS 110 of FIG. 1) described herein.

The DMS 210 may include the DMS manager 290, the nodes 285, a backup storage 225, and a backup mounting component 230. The DMS manager 290 may be an example of a DMS manager (e.g., the DMS manager 190 of FIG. 1) described herein. The DMS manager 290 may be configured to manage the capture (e.g., in coordination with the DMS agent 215), storage, restoration, and/or duplication of data of one or more computing systems (e.g., the first computing system 205-1) and/or one or more data objects (e.g., the first data object 220-1) at the one or more computing systems at different points in time.

In some examples, the DMS manager 290 is configured to capture the data of the computing systems using base and incremental backups. A base backup (which may also be referred to as a full backup) may capture a full set of data (e.g., user data, system data, file system data, metadata for the data, states of the data, configurations) stored at a computing system at a first point-in-time. An incremental backup may capture an incremental set of data stored at the computing system at a second point-in-time, where the incremental set of data may capture differences (e.g., modifications, additions, deletions) between the full set of data at the first point-in-time and the full set of data at the computing system at the second point-in-time. The incremental backups may enable the computing system and/or data objects at the computing system to be backed up at many different points-in-time with reduced storage resources, reduced data transfer, and the like.

In some examples, one or more backups taken by the DMS manager 290 may compose image backups of the computing systems and/or data objects at the computing systems at different point-in-times. As described herein, image backups may be byte-for-byte backups of the computing systems and/or data objects at the computing systems, and thus may be used to completely restore the computing systems and/or data objects—e.g., in the event of a catastrophic failure of the computing systems or one or more data objects.

The backup storage 225 may be configured to store backup files (e.g., image backup files, snapshot files) that reflect data captured from the computing systems and/or from data objects at the computing systems at different points in time. The backup storage 225 may store base and incremental backups that reflect data of the computing systems and/or data objects at the computing systems at many different points-in-time. In some examples, the backup files stored in the backup storage 225 may be able to fully recreate the computing systems and/or data object at each of the points-in-time. Full recreation may include a restoration of all data files, metadata, and system files in the same state as they are natively stored at the computing systems and/or data object (e.g., using the same folder structure, same file naming, same file organization).

The backup mounting component 230 may be configured to recreate and mount the point-in-time data—e.g., using resources of the DMS manager 290 that are accessible via a network connection. Recreating the point-in-time data may also be referred to as materializing the point-in-time data. As part of recreating the data, the backup mounting component 230 may restore all of the data files, metadata, and system files in a same state as they were natively stored at a computing system at a point-in-time to a location within the DMS 210 that is accessible via a network connection (e.g., a network file system (NFS) connection, a file transfer protocol (FTP) connection, a Web Distributed Authoring and Versioning (WebDAV) connection). In some examples, the backup mounting component 230 may be configured to recreate the point-in-time data at a single location within the DMS 110. The point-in-time data recreated at the single location may be accessible (e.g., in parallel) by each of the nodes 285.

The nodes 285 may be examples of storage nodes described herein (e.g., the storage nodes 185 of FIG. 1). The nodes 285 may assist in the capture, storage, restoration, and/or duplication of data of the computing systems. In some examples, the tasks for performing the foregoing functions may be allocated amongst the nodes 285, which may improve processing/signaling bandwidth, increase the amount of processing resources available for a data management procedure, and the like. In some examples, the nodes 285 may be used to form a distributed mounting point for data files recreated by the backup mounting component 230, where the nodes 285 may present as a single or multiple network drives mountable to a computing system.

The one or more computing systems 205 may include one or more DMS agents and one or more data objects. The one or more computing systems 205 may be, or include, physical or virtual machines (e.g., computers, servers). An operating system (e.g., a Linux server operating system) may be installed at the computing systems, where the operating system may support the installation and operation of data objects (e.g., applications, databases, file systems, virtual machines) at the computing systems. In some examples, the operating system may enable the operation of the DMS agents and the data objects. In some examples, the operating system may manage a higher-layer file system within which data objects may manage their respective files (using a same, similar, or different file system).

The data objects may be applications, virtual machines, databases, file systems. In some examples, the first data object 220-1 is a database (e.g., an Oracle database). The first data object 220-1 may also support the storage of data for the data object in very large files (e.g., files that are larger than a threshold size). In some examples, all of the data for the first data object 220-1 may be stored in a single file (e.g., a BigFile Tablespace). The first data object 220-1 may include native functions for managing the data of the data object. For example, the first data object 220-1 may include native functions that support the operation of the data object, such as functions for packaging data, organizing data, querying data, accessing data, deleting data, and adding data.

The first data object 220-1 may also include native functions for backing up data, restoring data, and duplicating data. In some examples, one of these native functions (e.g., the backup function) may include support for transferring files on a per-file or per-section basis. While other of these native functions (e.g., the restoration and duplication functions) may support transferring files on a per-file basis. As described herein, very large files transferred during a backup, restoration, or duplication procedure may act as a bottleneck and introduce significant latency into such procedures if transferred on a per-file basis.

The DMS agents may be configured to execute (e.g., in coordination with the DMS manager 290) data management functions for the computing system. For example, the first DMS agent 215-1 may be configured to execute a backup procedure for the first computing system 205-1 and/or one or more data objects at the first computing system 205-1—e.g., in accordance with a backup schedule set by the DMS manager 290. As part of the backup procedure, the first DMS agent 215-1 may be configured to trigger a native backup operation at the first data object 220-1. In some examples, the first DMS agent 215-1 may be configured to trigger a native section-wise image backup operation at the first data object 220-1. As part of triggering the native section-wise image backup operation, the first DMS agent 215-1 may be configured to indicate a target location at the DMS 210 for the data of the first data object 220-1 to be written. As described herein, the native section-wise image backup operation enables sections of files (e.g., very large files) to be backed up to the DMS 210 on a per-section basis, which may mitigate backup bottleneck that may otherwise be caused by a file-wise backup of very large files.

The first DMS agent 215-1 may also be configured to execute a restoration procedure for the first computing system 205-1 and/or one or more data objects at the first computing system 205-1. In some examples, the first DMS agent 215-1 may receive a restoration request from the first computing system 205-1 and may communicate the restoration request to the DMS manager 290 (to enable the DMS manager 290 and the first DMS agent 215-1 to coordinate the restoration). Additionally, or alternatively, the restoration request may be received at the DMS 210 and communicated to the first DMS agent 215-1 (to enable the DMS manager 290 and first DMS agent 215-1 to coordinate the restoration).

The first DMS agent 215-1 may also be configured to execute a duplication procedure (e.g., a cloning procedure) for the first computing system 205-1 and/or one or more data objects at the first computing system 205-1. In some examples, the first DMS agent 215-1 may receive a duplication request from the first computing system 205-1 and may communicate the duplication request to the DMS manager 290 (to enable the DMS manager 290 and the first DMS agent 215-1 to coordinate the duplication). Additionally, or alternatively, the duplication request may be received at the DMS 210 and communicated to the first DMS agent 215-1 (to enable the DMS manager 290 and first DMS agent 215-1 to coordinate the duplication).

In some examples, the DMS manager 290 may be configured to generate virtual partitions of one or more files (e.g., files that exceed a threshold size, files of a particular file type, files selected by a user, etc.) in point-in-time data materialized for a restoration or duplication procedure. The DMS manager 290 may be further configured to distribute the virtual partitions across the nodes 285. In some examples, the DMS manager 290 may receive (e.g., as part of the restoration or duplication procedure) a request to open a file of the one or more files for which virtual partitions are created. In response to the request to open the file, the DMS manager 290 may generate an external file descriptor that a computing system may use to reference the file—e.g., for future access operations. The DMS manager 290 may also generate multiple internal file descriptors that indicate the locations of the virtual partitions within the DMS 110 as well as a mapping between the external file descriptor and the internal file descriptors.

In response to a subsequent request to read the file received from a computing system, the DMS manager 290 may be configured to route instances of the subsequent request to the internal file locations. Accordingly, the subset of the nodes 285 storing the virtual partitions of the file may output respective sections of the file to the computing system, in parallel.

FIG. 3 shows an example of a set of operations for parallelizing restoration of database files in accordance with aspects of the present disclosure.

The process flow 300 may be performed by the nodes 385, the DMS manager 390 and/or the DMS agent 315, and the data object 320, which may be respective examples of nodes (e.g., the storage nodes 185 of FIG. 1, the nodes 285 of FIG. 2), a DMS manager (e.g., the DMS manager 190 of FIG. 1, the DMS manager 290 of FIG. 2), a DMS agent (e.g., the DMS agent 215 of FIG. 2), and a data object (e.g., the data object 220 of FIG. 2) described herein. In some examples, the process flow 300 illustrates an example set of operations performed to support parallelizing restoration of database files. For example, the process flow 300 may include operations for creating virtual partitions of a file and outputting sections of the file from the virtual partitions to a data object (e.g., during a restoration or duplication operation) in parallel.

At 302, a data management procedure (e.g., a restoration procedure, a duplication procedure, etc.) may be initiated. The data management procedure may be initiated by the DMS manager 390, the DMS agent 315, the data object 320, or any combination thereof. In some examples, the data management procedure is used to restore point-in-time data to the data object 320. In some examples, the data management procedure is used to duplicate point-in-time data to the data object 320 (e.g., where the point-in-time data may be stored for a different data object in a same or different computing system as the data object 320).

In some examples, the data management procedure includes triggering the data object 320 to perform a restoration procedure that is native to the data object 320. The native restoration procedure may support file-wise restoration of files of the point-in-time data e.g., the native restoration procedure may support the restoration of individual files and may not support the restoration of sections of individual files. Accordingly, computing threads designated for the native restoration procedure may be allocated on a per-file basis—e.g., a first computing thread may be allocated to restore a first file the point-in-time data, a second computing thread may be allocated to restore a second file the point-in-time data, and so on. Thus, in some examples, if the point-in-time data includes a very large file, the time to complete the restoration procedure using the native restoration procedure may be greater than or equal to the time for a single computing thread to transfer the very large file.

In some examples, the data management procedure includes triggering the data object 320 to perform a duplication procedure that is native to the data object 320. The duplication procedure may similarly support file-wise restoration of files of the point-in-time data and not section-wise restoration of files.

At 306, the point-in-time data may be materialized (e.g., by the DMS manager 390) at the DMS. In some examples, the DMS manager 390 materializes the point-in-time data from one or more data protection files. For example, the DMS manager 390 may materialize the point-in-time data from a full backup file and, in some examples, one or more incremental backup files. In other examples, the DMS manager 390 may materialize the point-in-time data from a full snapshot file and, in some examples, one or more incremental snapshot files. The materialized point-in-time data may include one or more files associated with the data object 320. In some examples, the files have a format that is native to the data object 320. In some examples, the materialized point-in-time data may be stored in a single location at the DMS that is accessible (e.g., in parallel) by one or more (e.g., each) of the nodes 385.

At 309, based on materializing the point-in-time data, one or more sets of virtual partitions may be created for one or more files of the point-in-time data. For example, a set of virtual partitions may be created for a file of the point-in-time data, where the file may exceed a size threshold, be of a particular file type, be previously selected by a user, or any combination thereof. In some examples, another set of virtual partitions may be created for another file of the point-in-time data that satisfies one or more of the foregoing criteria, and so on.

In some examples, the quantity of virtual partitions that is created is based on a section size that is selected to achieve a data transfer latency for the file. In some examples, the quantity of virtual partitions is based on a quantity of the nodes 385.

In some examples, a file management component at the DMS (e.g., in coordination with the DMS manager 390) may be used to create the virtual partitions at the nodes 385.

At 312, the virtual partitions of the file may be distributed amongst the nodes 385. In some examples, the virtual partitions are distributed to the nodes 385 in a round-robin order, though other allocation algorithms may be used without loss of operation. If the quantity of virtual partitions equals the quantity of nodes, then a virtual partition may be allocated to each of the nodes 385.

At 316, a request to open the file may be received—e.g., at the DMS manager 290 and/or the DMS agent 315 from the data object 320. In some examples, the request to open the file is received as part of the data object 320 executing a native restoration operation that does not support section-wise restoration of files. In some examples, the request to open the file is received as part of the data object 320 executing a native duplication operation that does not support section-wise restoration of files.

At 319, based on receiving the request to open the file, an external file descriptor for the file may be generated (e.g., by the DMS manager 390 and/or the DMS agent 315). The external file descriptor may provide an external file location that an external entity (e.g., the data object 320) may use to reference the file for subsequent access operations (e.g., read operations, write operations, etc.). Also, based on receiving the request to open the file, multiple internal file descriptors for the file may be generated. The internal file descriptors may provide internal file locations that are used, internally (e.g., by the DMS manager 390 and/or the DMS agent 315), to reference the virtual partitions of the file for subsequent access operations.

In some examples, the DMS manager 390 and/or the DMS agent 315 may generate a mapping between the external file descriptor and the internal file descriptors for the file. In some examples, the DMS manager 390 and/or the DMS agent 315 may generate a mapping between the internal file descriptors and the virtual partitions.

In some examples, the file management component (e.g., in coordination with the DMS manager 390) may be used to generate the external and/or internal file descriptors associated with the file and the sections of the file associated with the virtual partitions at the nodes 385.

At 322, the external file descriptor may be returned to the data object 320—e.g., in response to the request to open the file. The external file descriptor may be returned by the DMS manager 390 and/or the DMS agent 315.

At 326, a request to read the file may be received—e.g., at the DMS manager 290 and/or the DMS agent 315 from the data object 320. The request to read the file may be addressed to the external file descriptor. In some examples, the request to read the file may include an offset indicating where in the file to begin a read operation. In some examples, the offset is equal to zero to indicate that the read operation is to begin at the beginning of the ile.

At 329, multiple instances of the request to read the file may be routed to the nodes 385. Routing the request to read the file may include determining virtual partitions (e.g., the virtual partitions, a quantity of virtual partitions for the file) corresponding to the read request (e.g., based on the offset included in the request to read the file). Based on determining the virtual partitions of the file, the nodes and internal file descriptors corresponding to the virtual partitions of the file may be identified, and instances of the request to read the file may be sent to the node and determined virtual partitions of the file in accordance with the internal file descriptors.

In some examples, the file management component (e.g., in coordination with the DMS manager 390) may be used to route the read requests to the sections of the file associated with the virtual partitions at the nodes 385 in accordance with the internal file descriptors.

At 332, the sections of the files may be output, in parallel, from respective virtual partitions at respective virtual nodes (e.g., to the DMS agent 315). In some examples, the file management component (e.g., in coordination with the DMS manager 390) may be used to output the sections of the file associated with the virtual partitions at the nodes 385 in accordance with the received requests to read the sections of the file.

At 336, the sections of the file may be aggregated (e.g., by the DMS agent 315) into a single file. In some examples, the sections of the file are aggregated into a single file at the computing system that includes the data object 320.

At 339, based on aggregating the sections of the file, the file may be sent to the data object 320. In some examples, rather than aggregating and then sending the file to the data object, the sections of the file may be aggregated within a location of the computing system that is allocated to the files of the data object 320.

At 342, a request to close the file may be received (e.g., at the DMS manager 390 and/or DMS agent 315 from the data object 320). The request to close the file may include the external file descriptor of the file.

At 346, based on receiving the request to close the file, sections of the files may be closed (e.g., by the DMS manager 390 and/or the DMS agent 315). In some examples, closing the sections of the file includes closing the internal file descriptors associated with the file. In some examples, the file management component (e.g., in coordination with the DMS manager 390) may be used to close the sections of the file associated with the virtual partitions at the nodes 385 in accordance with the internal file descriptors.

At 349, an indication that the sections of the file have been closed may be sent. In some examples, the file management component (e.g., in coordination with the DMS manager 390) may be used to generate indications that the sections of the file associated with the virtual partitions at the nodes 385 have been closed. In some examples, the DMS manager 390 receives the indication that the sections of the files have been closed from the file management component. The DMS manager 390 may indicate to the DMS agent 315 that the file is closed after receiving indications that each of the sections of the files have been closed.

At 352, an indication that the file has been closed may be sent to the data object 320 (e.g., from the DMS manager 290 and/or the DMS agent 315). In some examples, the data management procedure may be terminated when the file is transferred to the data object. In other examples, aspects of the operations described above may be repeated to transfer additional files of the point-in-time data to the data object 320.

In some examples, in addition to partitioning particular files (e.g., files that exceed a size threshold, etc.) across the nodes 385-1 and transferring sections of the particular files to the data object in parallel, other files (e.g., files that are less than or equal to the size threshold) may be transferred to the data object individually (e.g., from a single node). In some examples, sections of the particular files are transferred in parallel with the files that are transferred individually.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
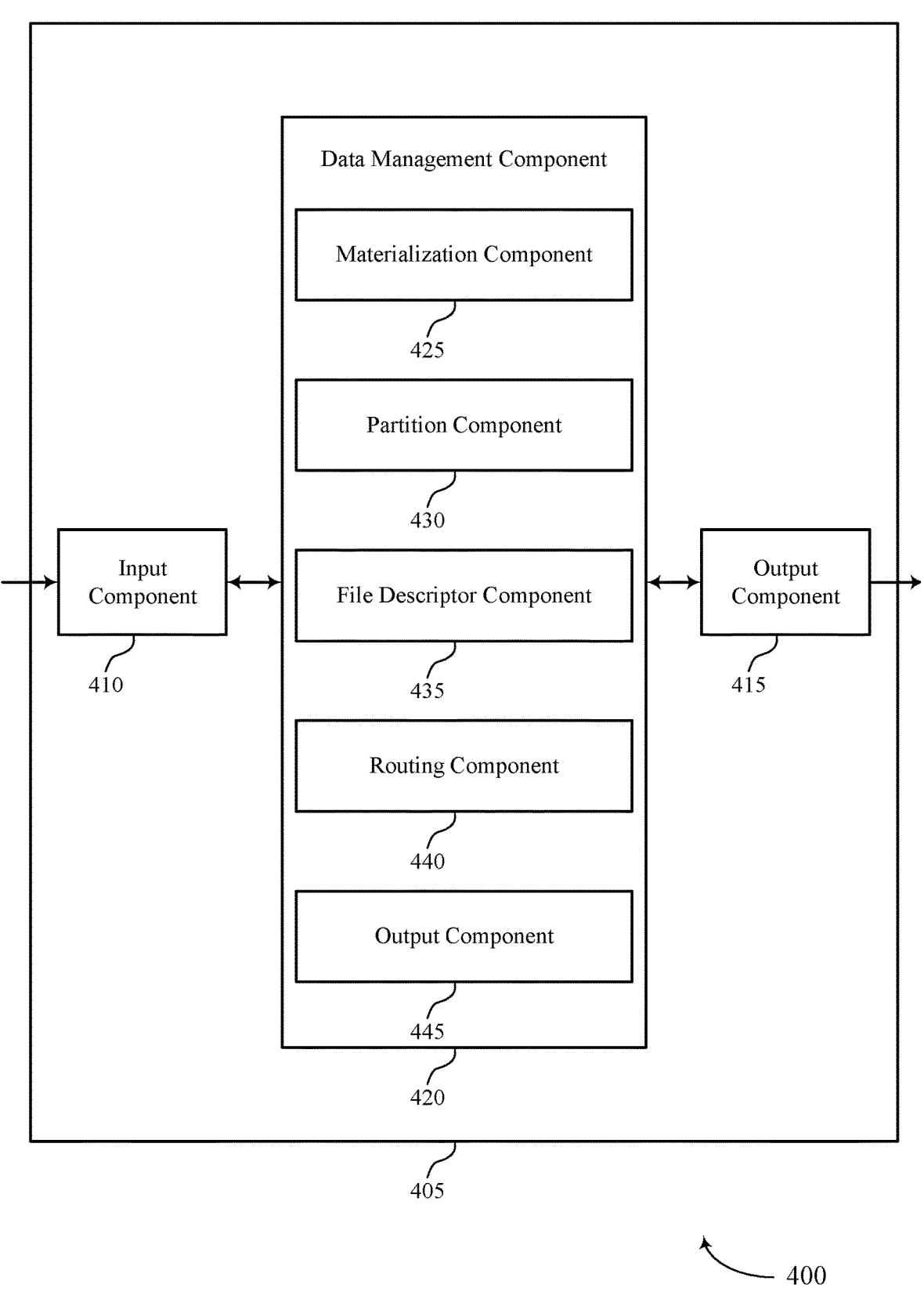
FIG. 4 shows a block diagram of an apparatus that supports parallelizing restoration of database files in accordance with aspects of the present disclosure.

FIG. 4 shows a block diagram 400 of a system 405 that supports parallelizing restoration of database files in accordance with aspects of the present disclosure. In some examples, the system 405 may be an example of aspects of one or more components described with reference to FIG. 1, such as a DMS 110. The system 405 may include an input component 410, an output component 415, and an data management component 420. The system 405 may also include one or more processors. Each of these components may be in communication with one another (e.g., via one or more buses, communications links, communications interfaces, or any combination thereof).

The input component 410 may manage input signals for the system 405. For example, the input component 410 may identify input signals based on an interaction with a modem, a keyboard, a mouse, a touchscreen, or a similar device. These input signals may be associated with user input or processing at other components or devices. In some cases, the input component 410 may utilize an operating system such as iOS®, ANDROID®, MS-DOS®, MS-WINDOWS®, OS/2®, UNIX®, LINUX®, or another known operating system to handle input signals. The input component 410 may send aspects of these input signals to other components of the system 405 for processing. For example, the input component 410 may transmit input signals to the data management component 420 to support parallelizing restoration of database files. In some cases, the input component 410 may be a component of an I/O controller 610 as described with reference to FIG. 6.

The output component 415 may manage output signals for the system 405. For example, the output component 415 may receive signals from other components of the system 405, such as the data management component 420, and may transmit these signals to other components or devices. In some specific examples, the output component 415 may transmit output signals for display in a user interface, for storage in a database or data store, for further processing at a server or server cluster, or for any other processes at any number of devices or systems. In some cases, the output component 415 may be a component of an I/O controller 610 as described with reference to FIG. 6.

For example, the data management component 420 may include a materialization component 425, a partition component 430, a file descriptor component 435, a routing component 440, an output component 445, or any combination thereof. In some examples, the data management component 420, or various components thereof, may be configured to perform various operations (e.g., receiving, monitoring, transmitting) using or otherwise in cooperation with the input component 410, the output component 415, or both. For example, the data management component 420 may receive information from the input component 410, send information to the output component 415, or be integrated in combination with the input component 410, the output component 415, or both to receive information, transmit information, or perform various other operations as described herein.

The materialization component 425 may be configured as or otherwise support a means for generating, from data management information stored at a data management system for a data object at a computing system, point-in-time data that includes a set of multiple files. The partition component 430 may be configured as or otherwise support a means for creating, at a set of multiple nodes of the data management system and based on generating the point-intime data, a set of multiple virtual partitions of a file included in the set of multiple files. The file descriptor component 435 may be configured as or otherwise support a means for generating, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes. The routing component 440 may be configured as or otherwise support a means for routing, to the set of multiple nodes, one or more second requests associated with reading the file included in the set of multiple files, where the one or more second requests are routed to the set of multiple nodes based on the set of multiple internal file descriptors generated in response to the first request. The output component 445 may be configured as or otherwise support a means for outputting, in parallel and in response to the one or more second requests to read the file included in the set of multiple files, respective portions of the file from the set of multiple virtual partitions to the computing system.

Figure 5:
FIG. 5 shows a block diagram of an data management component that supports parallelizing restoration of database files in accordance with aspects of the present disclosure.

FIG. 5 shows a block diagram 500 of a data management component 520 that supports parallelizing restoration of database files in accordance with aspects of the present disclosure. The data management component 520 may be an example of aspects of an data management component or an data management component 420, or both, as described herein. The data management component 520, or various components thereof, may be an example of means for performing various aspects of parallelizing restoration of database files as described herein. For example, the data management component 520 may include a materialization component 525, a partition component 530, a file descriptor component 535, a routing component 540, an output component 545, a restoration component 550, an aggregation component 555, a backup component 560, a duplication component 565, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The materialization component 525 may be configured as or otherwise support a means for generating, from data management information stored at a data management system for a data object at a computing system, point-in-time data that includes a set of multiple files. The partition component 530 may be configured as or otherwise support a means for creating, at a set of multiple nodes of the data management system and based on generating the point-in-time data, a set of multiple virtual partitions of a file included in the set of multiple files. The file descriptor component 535 may be configured as or otherwise support a means for generating, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes. The routing component 540 may be configured as or otherwise support a means for routing, to the set of multiple nodes, one or more second requests associated with reading the file included in the set of multiple files, where the one or more second requests are routed to the set of multiple nodes based on the set of multiple internal file descriptors generated in response to the first request. The output component 545 may be configured as or otherwise support a means for outputting, in parallel and in response to the one or more second requests to read the file included in the set of multiple files, respective portions of the file from the set of multiple virtual partitions to the computing system.

In some examples, the partition component 530 may be configured as or otherwise support a means for distributing the set of multiple virtual partitions of the file included in the set of multiple files across the set of multiple nodes.

In some examples, each node of the set of multiple nodes stores a respective virtual partition of the set of multiple virtual partitions of the file included in the set of multiple files.

In some examples, the file descriptor component 535 may be configured as or otherwise support a means for generating, based on generating the set of multiple internal file descriptors, a mapping from the set of multiple virtual partitions of the file included in the set of multiple files to respective internal file descriptors of the set of multiple internal file descriptors.

In some examples, the restoration component 550 may be configured as or otherwise support a means for performing, in response to the first request, a restoration procedure for restoring the point-in-time data. In some examples, the file descriptor component 535 may be configured as or otherwise support a means for receiving, during the restoration procedure, a request to open the file included in the set of multiple files, where the external file descriptor and the set of multiple internal file descriptors are generated in response to the request to open the file included in the set of multiple files.

In some examples, the file descriptor component 535 may be configured as or otherwise support a means for responding, to the request to open the file included in the set of multiple files, with the external file descriptor. In some examples, the file descriptor component 535 may be configured as or otherwise support a means for storing, in response to the request to open the file included in the set of multiple files, the set of multiple internal file descriptors, a mapping from the set of multiple virtual partitions of the file to respective internal file descriptors of the set of multiple internal file descriptors, or both.

In some examples, the routing component 540 may be configured as or otherwise support a means for receiving, after receiving a request to open the file included in the set of multiple files, a request to read the file included in the set of multiple files. In some examples, the routing component 540 may be configured as or otherwise support a means for identifying, in response to the request to read the file included in the set of multiple files, a set of virtual partitions from among the set of multiple virtual partitions of the file based on a size of the set of multiple virtual partitions and a quantity of the set of multiple nodes.

In some examples, the routing component 540 may be configured as or otherwise support a means for identifying an offset in the request to read the file included in the set of multiple files, where the set of virtual partitions of is further identified from among the set of multiple virtual partitions of the file based on the offset.

In some examples, the routing component 540 may be configured as or otherwise support a means for identifying, from among the set of multiple internal file descriptors and based on a mapping from the set of multiple virtual partitions of the file included in the set of multiple files to respective internal file descriptors included in the set of multiple internal file descriptors, a set of internal file descriptors corresponding to the set of virtual partitions of the set of multiple virtual partitions. In some examples, the routing component 540 may be configured as or otherwise support a means for identifying, from among the set of multiple nodes and based on the set of internal file descriptors, respective nodes corresponding to the respective internal file descriptors included in the set of internal file descriptors.

In some examples, routing the one or more second requests associated with reading the file of the set of multiple files includes routing one or more instances of the request to read the file to the respective nodes included in the set of multiple nodes in accordance with the respective internal file descriptors included in the set of internal file descriptors. In some examples, the respective portions of the file are output from the set of multiple virtual partitions based on routing the one or more instances of the request to read the file to the respective nodes.

In some examples, the restoration component 550 may be configured as or otherwise support a means for receiving, after outputting the respective portions of the file included in the set of multiple files from the set of multiple virtual partitions, a request to close the file included in the set of multiple files. In some examples, the file descriptor component 535 may be configured as or otherwise support a means for closing the set of multiple internal file descriptors in a sequential manner in response to the request to close the file included in the set of multiple files.

In some examples, the aggregation component 555 may be configured as or otherwise support a means for aggregating the respective portions of the file included in the set of multiple files into a single file at the computing system.

In some examples, the backup component 560 may be configured as or otherwise support a means for triggering, as part of a procedure for capturing the point-in-time data at the data management system, the data object to perform a backup procedure that is native to the data object and is configured to cause the data object to transfer the point-in-time data to the data management system. In some examples, the backup component 560 may be configured as or otherwise support a means for storing, as a result of the backup procedure, the data management information including the point-in-time data at the data management system.

In some examples, the restoration component 550 may be configured as or otherwise support a means for triggering, as part of a procedure for restoring the point-in-time data to the computing system, the data object to perform a restoration procedure that is native to the data object and is configured to cause the data object to retrieve the point-in-time data from the data management system, where the restoration procedure supports file-wise data transfer, and where the external file descriptor and the set of multiple internal file descriptors are generated based on triggering the data object to perform the restoration procedure.

In some examples, the duplication component 565 may be configured as or otherwise support a means for triggering, as part of a procedure for duplicating the point-in-time data at the computing system, the data object to perform a duplication procedure that is native to the data object and is configured to cause the data object to transfer the point-in-time data to the second computing system, where the duplication procedure supports file-wise data transfer, and where the external file descriptor and the set of multiple internal file descriptors are generated based on triggering the data object to perform the duplication procedure.

Figure 6:
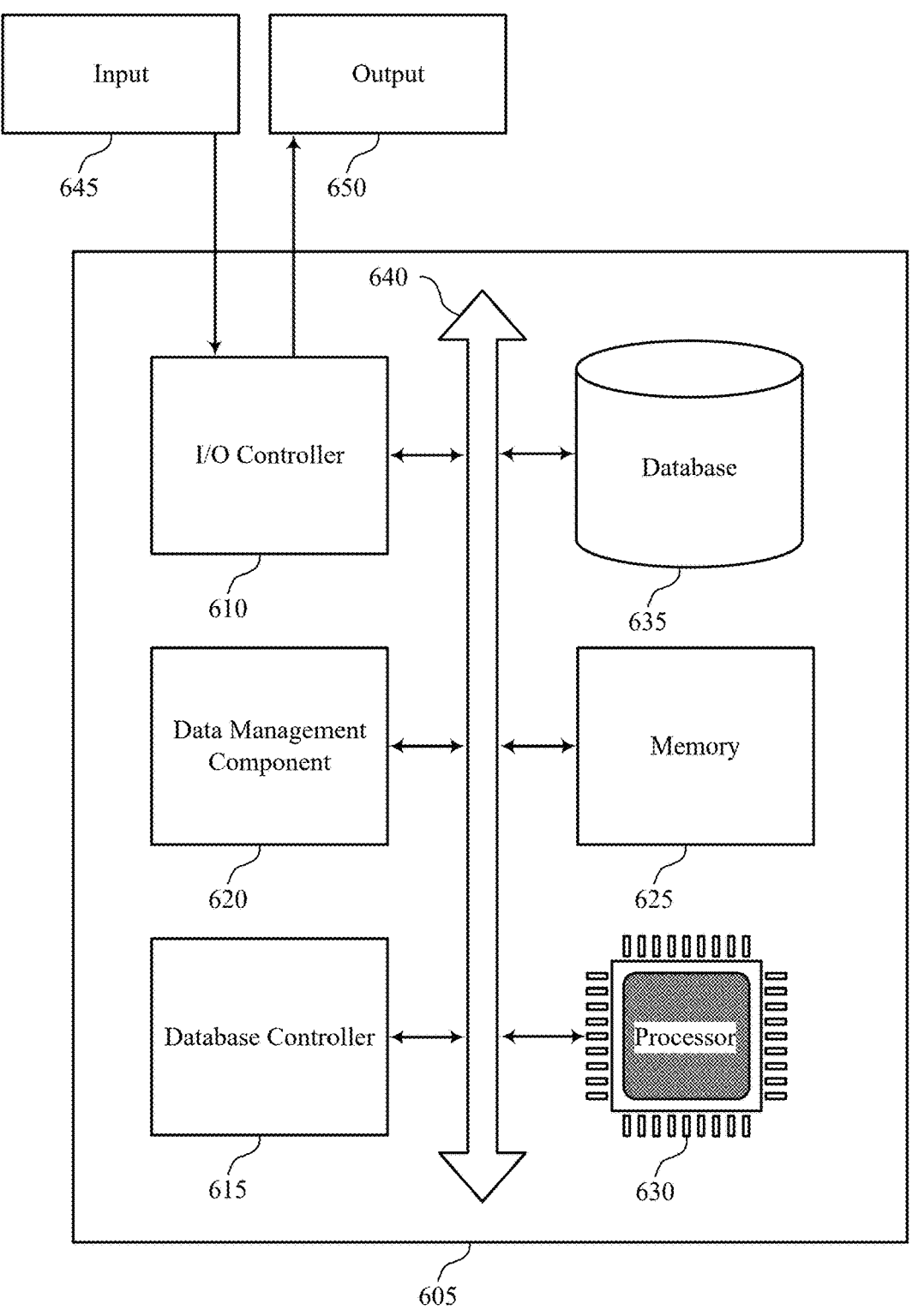
FIG. 6 shows a diagram of a system including a device that supports parallelizing restoration of database files in accordance with aspects of the present disclosure.

FIG. 6 shows a block diagram 600 of a system 605 that supports parallelizing restoration of database files in accordance with aspects of the present disclosure. The system 605 may be an example of or include the components of a system 405 as described herein. The system 605 may include components for data management, including components such as an data management component 620, an I/O controller 610, a database controller 615, at least one memory 625, at least one processor 630, and a database 635. These components may be in electronic communication or otherwise coupled with each other—e.g., operatively, communicatively, functionally, electronically, electrically; via one or more buses (e.g., bus 640), communications links, communications interfaces, or any combination thereof. Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The I/O controller 610 may manage input signals 645 and output signals 650 for the system 605. The I/O controller 610 may also manage peripherals not integrated into the system 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some cases, the I/O controller 610 may be implemented as part of a processor. In some examples, a user may interact with the system 605 via the I/O controller 610 or via hardware components controlled by the I/O controller 610.

The database controller 615 may manage data storage and processing in a database 635. The database 635 may be external to the system 605, temporarily or permanently connected to the system 605, or a data storage component of the system 605. In some cases, a user may interact with the database controller 615. In some other cases, the database controller 615 may operate automatically without user interaction. The database 635 may be an example of a persistent data store, a single database, a distributed database, multiple distributed databases, a database management system, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a BIOS which may control basic hardware or software operation such as the interaction with peripheral components or devices.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In some other cases, a memory controller may be integrated into the processor 630. The processor 630 may be configured to execute computer-readable instructions stored in memory 625 to perform various functions (e.g., functions or tasks supporting parallelizing restoration of database files).

For example, the data management component 620 may be configured as or otherwise support a means for generating, from data management information stored at a data management system for a data object at a computing system, point-in-time data that includes a set of multiple files. The data management component 620 may be configured as or otherwise support a means for creating, at a set of multiple nodes of the data management system and based on generating the point-in-time data, a set of multiple virtual partitions of a file included in the set of multiple files. The data management component 620 may be configured as or otherwise support a means for generating, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes. The data management component 620 may be configured as or otherwise support a means for routing, to the set of multiple nodes, one or more second requests associated with reading the file included in the set of multiple files, where the one or more second requests are routed to the set of multiple nodes based on the set of multiple internal file descriptors generated in response to the first request. The data management component 620 may be configured as or otherwise support a means for outputting, in parallel and in response to the one or more second requests to reading the file included in the set of multiple files, respective portions of the file from the set of multiple virtual partitions to the computing system.

By including or configuring the data management component 620 in accordance with examples as described herein, the system 605 may support techniques for parallelizing restoration of database files, which may provide one or more benefits such as, for example, decreasing a latency associated with transferring files that exceed a size threshold and mitigating bottlenecks in a data management procedure, among other possibilities.

FIG. 7 shows a flowchart illustrating a method 700 that supports parallelizing restoration of database files in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include generating, from data management information stored at a data management system for a data object at a computing system, point-in-time data that includes a set of multiple files. The operations at 705 may be performed in accordance with examples as disclosed herein. In some examples, aspects of the operations of 705 may be performed by a materialization component 525 as described with reference to FIG. 5.

At 710, the method may include creating, at a set of multiple nodes of the data management system and based on generating the point-in-time data, a set of multiple virtual partitions of a file included in the set of multiple files. The operations at 710 may be performed in accordance with examples as disclosed herein. In some examples, aspects of the operations of 710 may be performed by a partition component 530 as described with reference to FIG. 5.

At 715, the method may include generating, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes. The operations at 715 may be performed in accordance with examples as disclosed herein. In some examples, aspects of the operations of 715 may be performed by a file descriptor component 535 as described with reference to FIG. 5.

At 720, the method may include routing, to the set of multiple nodes, one or more second requests associated with reading the file included in the set of multiple files, where the one or more second requests are routed to the set of multiple nodes based on the set of multiple internal file descriptors generated in response to the first request. The operations at 720 may be performed in accordance with examples as disclosed herein. In some examples, aspects of the operations of 720 may be performed by a routing component 540 as described with reference to FIG. 5.

At 725, the method may include outputting, in parallel and in response to the one or more second requests to read the file included in the set of multiple files, respective portions of the file from the set of multiple virtual partitions to the computing system. The operations at 725 may be performed in accordance with examples as disclosed herein. In some examples, aspects of the operations of 725 may be performed by an output component 545 as described with reference to FIG. 5.

A method by an apparatus is described. The method may include generating, from data management information stored at a data management system for a data object at a computing system, point-in-time data that includes a set of multiple files, creating, at a set of multiple nodes of the data management system and based on generating the point-in-time data, a set of multiple virtual partitions of a file included in the set of multiple files, generating, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes, routing, to the set of multiple nodes, one or more second requests associated with reading the file included in the set of multiple files, where the one or more second requests are routed to the set of multiple nodes based on the set of multiple internal file descriptors generated in response to the first request, and outputting, in parallel and in response to the one or more second requests to read the file included in the set of multiple files, respective portions of the file from the set of multiple virtual partitions to the computing system.

An apparatus is described. The apparatus may include one or more memories storing processor executable code, and one or more processors coupled with the one or more memories. The one or more processors may individually or collectively operable to execute the code to cause the apparatus to generate, from data management information stored at a data management system for a data object at a computing system, point-in-time data that includes a set of multiple files, create, at a set of multiple nodes of the data management system and based on generating the point-in-time data, a set of multiple virtual partitions of a file included in the set of multiple files, generate, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes, route, to the set of multiple nodes, one or more second requests associated with reading the file included in the set of multiple files, where the one or more second requests are routed to the set of multiple nodes based on the set of multiple internal file descriptors generated in response to the first request, and outputting, in parallel and in response to the one or more second requests to read the file included in the set of multiple files, respective portions of the file from the set of multiple virtual partitions to the computing system.

Another apparatus is described. The apparatus may include means for generating, from data management information stored at a data management system for a data object at a computing system, point-in-time data that includes a set of multiple files, means for creating, at a set of multiple nodes of the data management system and based on generating the point-in-time data, a set of multiple virtual partitions of a file included in the set of multiple files, means for generating, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes, means for routing, to the set of multiple nodes, one or more second requests associated with reading the file included in the set of multiple files, where the one or more second requests are routed to the set of multiple nodes based on the set of multiple internal file descriptors generated in response to the first request, and means for outputting, in parallel and in response to the one or more second requests to read the file included in the set of multiple files, respective portions of the file from the set of multiple virtual partitions to the computing system.

A non-transitory computer-readable medium storing code is described. The code may include instructions executable by a processor to generate, from data management information stored at a data management system for a data object at a computing system, point-in-time data that includes a set of multiple files, create, at a set of multiple nodes of the data management system and based on generating the point-in-time data, a set of multiple virtual partitions of a file included in the set of multiple files, generate, based on a first request associated with restoring the point-in-time data to the computing system or a second computing system, an external file descriptor associated with a location of the file at the data management system and a set of multiple internal file descriptors associated with locations of the set of multiple virtual partitions of the file at the set of multiple nodes, route, to the set of multiple nodes, one or more second requests associated with reading the file included in the set of multiple files, where the one or more second requests are routed to the set of multiple nodes based on the set of multiple internal file descriptors generated in response to the first request, and outputting, in parallel and in response to the one or more second requests to read the file included in the set of multiple files, respective portions of the file from the set of multiple virtual partitions to the computing system.

Some examples of the method, apparatus, and non-transitory computer-readable medium described herein may further include operations, features, means, or instructions for distributing the set of multiple virtual partitions of the file of the set of multiple files across the set of multiple nodes.

In some examples of the method, apparatus, and non-transitory computer-readable medium described herein, each node of the set of multiple nodes stores a respective virtual partition of the set of multiple virtual partitions of the file included in the set of multiple files.

Some examples of the method, apparatus, and non-transitory computer-readable medium described herein may further include operations, features, means, or instructions for generating, based on generating the set of multiple internal file descriptors, a mapping from the set of multiple virtual partitions of the file included in the set of multiple files to respective internal file descriptors of the set of multiple internal file descriptors.

Some examples of the method, apparatus, and non-transitory computer-readable medium described herein may further include operations, features, means, or instructions for performing, in response to the first request, a restoration procedure for restoring the point-in-time data and receiving, during the restoration procedure, a request to open the file included in the set of multiple files, where the external file descriptor and the set of multiple internal file descriptors may be generated in response to the request to open the file included in the set of multiple files.

Some examples of the method, apparatus, and non-transitory computer-readable medium described herein may further include operations, features, means, or instructions for responding, to the request to open the file included in the set of multiple files, with the external file descriptor and storing, in response to the request to open the file included in the set of multiple files, the set of multiple internal file descriptors, a mapping from the set of multiple virtual partitions of the file to respective internal file descriptors of the set of multiple internal file descriptors, or both.

Some examples of the method, apparatus, and non-transitory computer-readable medium described herein may further include operations, features, means, or instructions for receiving, after receiving a request to open the file included in the set of multiple files, a request to read the file included in the set of multiple files and identifying, in response to the request to read the file included in the set of multiple files, a set of virtual partitions from among the set of multiple virtual partitions of the file based on a size of the set of multiple virtual partitions and a quantity of the set of multiple nodes.

Some examples of the method, apparatus, and non-transitory computer-readable medium described herein may further include operations, features, means, or instructions for identifying an offset in the request to read the file included in the set of multiple files, where the set of virtual partitions may be further identified from among the set of multiple virtual partitions of the file included in the set of multiple files based on the offset.

In some examples of the method, apparatus, and non-transitory computer-readable medium described herein, identifying, from among the set of multiple internal file descriptors and based on a mapping from the set of multiple virtual partitions of the file included in the set of multiple files to respective internal file descriptors of the set of multiple internal file descriptors, a set of internal file descriptors of corresponding to the set of virtual partitions included in the set of multiple virtual partitions and identifying, from among the set of multiple nodes and based on the set of internal file descriptors, respective nodes corresponding to the respective internal file descriptors included in the set of internal file descriptors.

In some examples of the method, apparatus, and non-transitory computer-readable medium described herein, operations, features, means, or instructions for routing the one or more second requests associated with reading the file included in the set of multiple files include may include operations, features, means, or instructions for routing one or more instances of the request to read the file to the respective nodes included in the set of multiple nodes in accordance with the respective internal file descriptors included in the set of internal file descriptors and the respective portions of the file may be output from the set of multiple virtual partitions based on routing the one or more instances of the request to read the file to the respective nodes.

Some examples of the method, apparatus, and non-transitory computer-readable medium described herein may further include operations, features, means, or instructions for receiving, after outputting the respective portions of the file included in the set of multiple files from the set of multiple virtual partitions, a request to close the file included in the set of multiple files and closing the set of multiple internal file descriptors in a sequential manner in response to the request to close the file included in the set of multiple files.

Some examples of the method, apparatus, and non-transitory computer-readable medium described herein may further include operations, features, means, or instructions for aggregating the respective portions of the file included in the set of multiple files into a single file at the computing system.

Some examples of the method, apparatus, and non-transitory computer-readable medium described herein may further include operations, features, means, or instructions for triggering, as part of a procedure for capturing the point-in-time data at the data management system, the data object to perform a backup procedure that may be native to the data object and may be configured to cause the data object to transfer the point-in-time data to the data management system and storing, as a result of the backup procedure, the data management information including the point-in-time data at the data management system.

Some examples of the method, apparatus, and non-transitory computer-readable medium described herein may further include operations, features, means, or instructions for triggering, as part of a procedure for restoring the point-in-time data to the computing system, the data object to perform a restoration procedure that may be native to the data object and may be configured to cause the data object to retrieve the point-in-time data from the data management system, where the restoration procedure supports file-wise data transfer, and where the external file descriptor and the set of multiple internal file descriptors may be generated based on triggering the data object to perform the restoration procedure.

Some examples of the method, apparatus, and non-transitory computer-readable medium described herein may further include operations, features, means, or instructions for triggering, as part of a procedure for duplicating the point-in-time data at the computing system, the data object to perform a duplication procedure that may be native to the data object and may be configured to cause the data object to transfer the point-in-time data to the second computing system, where the duplication procedure supports file-wise data transfer, and where the external file descriptor and the set of multiple internal file descriptors may be generated based on triggering the data object to perform the duplication procedure.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
generating, from data management information stored at a data management system for a data object at a computing system, point-in-time data that comprises a plurality of files;
creating, at a plurality of nodes of the data management system and based at least in part on generating the point-in-time data, a plurality of virtual partitions of a file included in the plurality of files;
generating, in response to receiving a first request associated with restoring the point-in-time data from the data management system to the computing system or a second computing system, an external file descriptor associated with a location of the file at the data management system and a plurality of internal file descriptors associated with locations of the plurality of virtual partitions of the file at the plurality of nodes;
routing, to the plurality of nodes, one or more second requests associated with reading the file included in the plurality of files, wherein the one or more second requests are routed to the plurality of nodes based at least in part on the plurality of internal file descriptors generated in response to the first request;
outputting, in parallel and in response to the one or more second requests to read the file included in the plurality of files, respective portions of the file from the plurality of virtual partitions to the computing system;
receiving, after outputting the respective portions of the file included in the plurality of files from the plurality of virtual partitions, a request to close the file; and
closing the plurality of internal file descriptors in a sequential manner in response to the request to close the file.

2. The method of claim 1, further comprising:
distributing the plurality of virtual partitions of the file across the plurality of nodes.

3. The method of claim 2, wherein each node of the plurality of nodes stores a respective virtual partition of the plurality of virtual partitions of the file.

4. The method of claim 1, further comprising:
generating, based at least in part on generating the plurality of internal file descriptors, a mapping from the plurality of virtual partitions of the file to respective internal file descriptors of the plurality of internal file descriptors.

5. The method of claim 1, further comprising:
performing, in response to the first request, a restoration procedure for restoring the point-in-time data; and
receiving, during the restoration procedure, a request to open the file included in the plurality of files, wherein the external file descriptor and the plurality of internal file descriptors are generated in response to the request to open the file.

6. The method of claim 5, further comprising:
responding, to the request to open the file included in the plurality of files, with the external file descriptor; and
storing, in response to the request to open the file included in the plurality of files, the plurality of internal file descriptors, a mapping from the plurality of virtual partitions of the file to respective internal file descriptors of the plurality of internal file descriptors, or both.

7. The method of claim 1, further comprising:
receiving, after receiving a request to open the file included in the plurality of files, a request to read the file; and
identifying, in response to the request to read the file included in the plurality of files, a set of virtual partitions from among the plurality of virtual partitions of the file based at least in part on a size of the plurality of virtual partitions and a quantity of the plurality of nodes.

8. The method of claim 7, further comprising:
identifying an offset in the request to read the file included in the plurality of files, wherein the set of virtual partitions is further identified from among the plurality of virtual partitions of the file based at least in part on the offset.

9. The method of claim 7, further comprising:
identifying, from among the plurality of internal file descriptors and based at least in part on a mapping from the plurality of virtual partitions of the file to respective internal file descriptors of the plurality of internal file descriptors, a set of internal file descriptors corresponding to the set of virtual partitions; and
identifying, from among the plurality of nodes and based at least in part on the set of internal file descriptors, respective nodes corresponding to the respective internal file descriptors included in the set of internal file descriptors.

10. The method of claim 9, wherein routing the one or more second requests associated with reading the file included in the plurality of files comprises:
routing one or more instances of the request to read the file to the respective nodes in accordance with the respective internal file descriptors included in the set of internal file descriptors, wherein the respective portions of the file are output from the plurality of virtual partitions based at least in part on routing the one or more instances of the request to read the file to the respective nodes.

11. The method of claim 1, further comprising:
aggregating the respective portions of the file into a single file at the computing system.

12. The method of claim 1, further comprising:
triggering, as part of a procedure for capturing the point-in-time data at the data management system, the data object to perform a backup procedure that is native to the data object and is configured to cause the data object to transfer the point-in-time data to the data management system; and
storing, as a result of the backup procedure, the data management information comprising the point-in-time data at the data management system.

13. The method of claim 1, further comprising:
triggering, as part of a procedure for restoring the point-in-time data to the computing system, the data object to perform a restoration procedure that is native to the data object and is configured to cause the data object to retrieve the point-in-time data from the data management system, wherein the restoration procedure supports file-wise data transfer, and wherein the external file descriptor and the plurality of internal file descriptors are generated based at least in part on triggering the data object to perform the restoration procedure.

14. The method of claim 1, further comprising:
triggering, as part of a procedure for duplicating the point-in-time data at the computing system, the data object to perform a duplication procedure that is native to the data object and is configured to cause the data object to transfer the point-in-time data to the second computing system, wherein the duplication procedure supports file-wise data transfer, and wherein the external file descriptor and the plurality of internal file descriptors are generated based at least in part on triggering the data object to perform the duplication procedure.

15. The method of claim 1, wherein the computing system, the second computing system, or both are separate from the data management system, and wherein the external file descriptor is used to address the file by the computing system, the second computing system, or both, the method further comprising:
receiving, from either the computing system or the second computing system, a request to read the file, the request to read the file comprising the external file descriptor.

16. An apparatus, comprising:
one or more processors; and
one or more memories storing instructions executable, individually or collectively, by the one or more processors to cause the apparatus to:
generate, from data management information stored at a data management system for a data object at a computing system, point-in-time data that comprises a plurality of files;
create, at a plurality of nodes of the data management system and based at least in part on generating the point-in-time data, a plurality of virtual partitions of a file included in the plurality of files;
generate, in response to receiving a first request associated with restoring the point-in-time data from the data management system to the computing system or a second computing system, an external file descriptor associated with a location of the file at the data management system and a plurality of internal file descriptors associated with locations of the plurality of virtual partitions of the file at the plurality of nodes;
route, to the plurality of nodes, one or more second requests associated with reading the file included in the plurality of files, wherein the one or more second requests are routed to the plurality of nodes based at least in part on the plurality of internal file descriptors generated in response to the first request;
output, in parallel and in response to the one or more second requests to read the file included in the plurality of files, respective portions of the file from the plurality of virtual partitions to the computing system;
receive, after outputting the respective portions of the file included in the plurality of files from the plurality of virtual partitions, a request to close the file; and
close the plurality of internal file descriptors in a sequential manner in response to the request to close the file.

17. The apparatus of claim 16, wherein the instructions are further executable, individually or collectively, by the one or more processors to cause the apparatus to:
distribute the plurality of virtual partitions of the file across the plurality of nodes.

18. The apparatus of claim 16, wherein the instructions are further executable, individually or collectively, by the one or more processors to cause the apparatus to:
generate, based at least in part on generating the plurality of internal file descriptors, a mapping from the plurality of virtual partitions of the file to respective internal file descriptors of the plurality of internal file descriptors.

19. A non-transitory, computer-readable medium storing code that comprises instructions executable, individually or collectively, by one or more processors of an electronic device to cause the electronic device to:

generate, from data management information stored at a data management system for a data object at a computing system, point-in-time data that comprises a plurality of files;

create, at a plurality of nodes of the data management system and based at least in part on generating the point-in-time data, a plurality of virtual partitions of a file included in the plurality of files;

generate, in response to receiving a first request associated with restoring the point-in-time data from the data management system to the computing system or a second computing system, an external file descriptor associated with a location of the file at the data management system and a plurality of internal file descriptors associated with locations of the plurality of virtual partitions of the file at the plurality of nodes;

route, to the plurality of nodes, one or more second requests associated with reading the file included in the plurality of files, wherein the one or more second requests are routed to the plurality of nodes based at least in part on the plurality of internal file descriptors generated in response to the first request;

output, in parallel and in response to the one or more second requests to read the file included in the plurality of files, respective portions of the file from the plurality of virtual partitions to the computing system;

receive, after outputting the respective portions of the file included in the plurality of files from the plurality of virtual partitions, a request to close the file; and close the plurality of internal file descriptors in a sequential manner in response to the request to close the file.

\* \* \* \* \*